US010409443B2

(12) United States Patent
Wright et al.

(10) Patent No.: US 10,409,443 B2
(45) Date of Patent: Sep. 10, 2019

(54) CONTEXTUAL CURSOR DISPLAY BASED ON HAND TRACKING

(71) Applicant: Microsoft Technology Licensing, LLC, Redmond, WA (US)

(72) Inventors: Shawn Crispin Wright, Sammamish, WA (US); Dan Osborn, Woodinville, WA (US); Joe Thompson, Seattle, WA (US); Scott Robert Ramsby, Kirkland, WA (US); Forest Woodcroft Gouin, Seattle, WA (US); Megan Saunders, Kirkland, WA (US); Aaron David Cottle, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 604 days.

(21) Appl. No.: 14/748,646

(22) Filed: Jun. 24, 2015

(65) Prior Publication Data
US 2016/0378294 A1 Dec. 29, 2016

(51) Int. Cl.
*G06F 3/01* (2006.01)
*G06T 19/00* (2011.01)
(Continued)

(52) U.S. Cl.
CPC ....... *G06F 3/04812* (2013.01); *G02B 27/017* (2013.01); *G06F 3/013* (2013.01); *G06F 3/017* (2013.01); *G06F 3/04815* (2013.01); *G06F 3/04817* (2013.01); *G06F 3/04842* (2013.01); *G06F 3/04845* (2013.01); *G06T 19/006* (2013.01); *G02B 2027/014* (2013.01);
(Continued)

(58) Field of Classification Search
None
See application file for complete search history.

(56) References Cited

U.S. PATENT DOCUMENTS 6,021,403 A 2/2000 Horvitz et al.
6,842,877 B2 1/2005 Robarts et al.
(Continued)

FOREIGN PATENT DOCUMENTS

WO 2013033842 A1 3/2013

OTHER PUBLICATIONS

Definition of cursor, accessed Apr. 11, 2018, 1 page.*
(Continued)

*Primary Examiner* — Yongjia Pan
(74) *Attorney, Agent, or Firm* — Alleman Hall Creasman & Tuttle LLP

(57) ABSTRACT

A head mounted display device and method for contextual cursors comprising a camera configured to capture a series of images, a display, and a processor configured to: display, to a user of the head mounted display device, a virtual cursor on display so as to appear at a location in a three dimensional environment, determine whether motion of a hand of the user in the images is trackable, and in response to at least determining that motion of the hand is trackable, modify a visual appearance of the virtual cursor to indicate that motion of the hand is trackable, and in response to at least determining that motion of the hand is not trackable, modify the visual appearance of the virtual cursor to indicate that motion of the hand is not trackable.

11 Claims, 9 Drawing Sheets

US 10,409,443 B2

Page 2

(51) Int. Cl.
*G02B 27/01* (2006.01)
*G06F 3/0481* (2013.01)
*G06F 3/0484* (2013.01)

(52) U.S. Cl.
CPC .......... *G02B 2027/0138* (2013.01); *G02B 2027/0174* (2013.01); *G02B 2027/0178* (2013.01); *G02B 2027/0187* (2013.01)

(56) References Cited

U.S. PATENT DOCUMENTS

| | | | |
|---|---|---|---|
| 7,493,153 B2* | 2/2009 | Ahmed | G02B 27/017 345/7 |
| 7,561,143 B1* | 7/2009 | Milekic | G06F 3/013 345/156 |
| 7,684,592 B2* | 3/2010 | Paul | G06F 3/017 382/103 |
| 8,479,110 B2 | 7/2013 | Johnson et al. | |
| 8,566,717 B2 | 10/2013 | Markiewicz et al. | |
| 8,671,365 B2 | 3/2014 | Berus | |
| 8,773,355 B2* | 7/2014 | Perez | A63F 13/10 345/158 |
| 8,881,051 B2* | 11/2014 | Frey | G06F 3/013 715/716 |
| 8,964,298 B2* | 2/2015 | Haddick | G06F 3/013 359/630 |
| 9,170,674 B2* | 10/2015 | Forutanpour | G06F 3/014 |
| 9,703,373 B2* | 7/2017 | Kohlhoff | G06F 3/013 |
| 9,710,130 B2* | 7/2017 | Mulcahy | G06F 3/04815 |
| 2002/0006222 A1 | 1/2002 | Inagaki et al. | |
| 2002/0044152 A1* | 4/2002 | Abbott, III | G06T 11/00 345/629 |
| 2004/0131232 A1* | 7/2004 | Meisner | G01S 5/16 382/103 |
| 2004/0201857 A1* | 10/2004 | Foxlin | G02B 27/017 356/620 |
| 2005/0206583 A1 | 9/2005 | Lemelson et al. | |
| 2009/0027330 A1* | 1/2009 | Aida | G06F 3/04883 345/156 |
| 2010/0103075 A1* | 4/2010 | Kalaboukis | A63F 13/02 345/8 |
| 2011/0083112 A1* | 4/2011 | Matsubara | G06F 3/011 715/863 |
| 2011/0148798 A1* | 6/2011 | Dahl | G06F 3/011 345/173 |
| 2011/0175932 A1 | 7/2011 | Yu et al. | |
| 2012/0113223 A1* | 5/2012 | Hilliges | G06F 3/00 348/46 |
| 2012/0206322 A1 | 8/2012 | Osterhout et al. | |
| 2012/0249587 A1* | 10/2012 | Anderson | G06F 3/04895 345/633 |
| 2012/0319949 A1* | 12/2012 | Lee | G06F 3/0304 345/158 |
| 2013/0007668 A1* | 1/2013 | Liu | G06F 3/012 715/841 |
| 2013/0055150 A1* | 2/2013 | Galor | G09G 5/34 715/784 |
| 2013/0135288 A1 | 5/2013 | King et al. | |
| 2013/0154913 A1* | 6/2013 | Genc | G06F 3/012 345/156 |
| 2013/0194164 A1* | 8/2013 | Sugden | G02B 27/017 345/8 |
| 2013/0271363 A1* | 10/2013 | Poznansky | G06F 3/014 345/156 |
| 2013/0301926 A1* | 11/2013 | Eilat | G06K 9/00355 382/195 |
| 2013/0307764 A1 | 11/2013 | Denker et al. | |
| 2013/0307771 A1 | 11/2013 | Parker et al. | |
| 2013/0307875 A1* | 11/2013 | Anderson | G06T 19/006 345/633 |
| 2014/0063050 A1 | 3/2014 | Fateh | |
| 2014/0125577 A1* | 5/2014 | Hoang | G06F 3/017 345/156 |
| 2014/0152558 A1 | 6/2014 | Salter et al. | |
| 2014/0168267 A1* | 6/2014 | Kim | G06F 3/017 345/633 |
| 2014/0180972 A1 | 6/2014 | Boldyrev et al. | |
| 2014/0184550 A1* | 7/2014 | Hennessey | G06F 3/013 345/173 |
| 2014/0237366 A1* | 8/2014 | Poulos | G06F 3/011 715/728 |
| 2014/0258942 A1* | 9/2014 | Kutliroff | G06F 3/013 715/863 |
| 2014/0282162 A1* | 9/2014 | Fein | G06F 3/0486 715/769 |
| 2014/0282282 A1* | 9/2014 | Holz | G06F 3/0304 715/863 |
| 2014/0285520 A1* | 9/2014 | Park | G06T 19/006 345/633 |
| 2014/0361988 A1* | 12/2014 | Katz | G06F 3/011 345/156 |
| 2014/0368535 A1* | 12/2014 | Salter | G02B 27/017 345/619 |
| 2015/0062000 A1* | 3/2015 | Saito | G02B 27/017 345/156 |
| 2015/0103003 A1 | 4/2015 | Kerr et al. | |
| 2015/0130740 A1* | 5/2015 | Cederlund | G06F 3/014 345/173 |
| 2016/0004306 A1* | 1/2016 | Maltz | G06F 3/013 345/173 |
| 2016/0132139 A1* | 5/2016 | Du | G06F 3/0488 345/173 |
| 2016/0140763 A1* | 5/2016 | Seichter | G06F 3/013 345/633 |
| 2016/0162082 A1* | 6/2016 | Schwesinger | G02B 27/017 345/173 |
| 2016/0224123 A1* | 8/2016 | Antoniac | G06F 3/017 |
| 2016/0232715 A1* | 8/2016 | Lee | G06T 19/006 |
| 2016/0253044 A1* | 9/2016 | Katz | G06F 3/017 345/156 |
| 2016/0284134 A1* | 9/2016 | Kamhi | G06F 3/011 |
| 2016/0321841 A1* | 11/2016 | Christen | G06T 19/006 |
| 2016/0379414 A1* | 12/2016 | Brown | G06F 3/04842 345/633 |

OTHER PUBLICATIONS

IPEA European Patent Office, Second Written Opinion Issued in PCT Application No. PCT/US2016/036112, dated Jun. 1, 2017, WIPO, 10 pages.

Ajanki et al., "An Augmented Reality Interface to Contextual Information", In Virtual Reality—Special Issue on Augmented Reality, vol. 15, Issue 2-3, Jun. 1, 2011, 15 Pages.

Meers et al., "Haptic Gaze-Tracking Based Perception of Graphical User Interfaces", In Proceedings of 11th International Conference on Information Visualisation, Jul. 4, 2007, 15 pages.

Doswell et al., "Augmenting Human Cognition with Adaptive Augmented Reality", In Proceedings of Foundations of Augmented Cognition Advancing Human Performance and Decision-Making through Adaptive Systems Lecture Notes in Computer Science vol. 8534, Retrieved on : May 25, 2015, 4 Pages.

Porta et al., "ceCursor, a Contextual Eye Cursor for General Pointing in Windows Environments", In Proceedings of the 2010 Symposium on Eye-Tracking Research & Applications, Mar. 22, 2010, 8 pages.

Chapuis et al., "UIMarks: Quick Graphical Interaction with Specific Targets", In Proceedings of the 23th annual ACM Symposium on User Interface Software and Technology, Oct. 3, 2010, 10 pages.

ISA European Patent Office, International Search Report and Written Opinion Issued in PCT Application No. PCT/US2016/036112, dated Sep. 1, 2016, WIPO, 13 pages.

"International Preliminary Report on Patentability Issued in PCT Application No. PCT/US2016/036112", dated Sep. 11, 2017, 11 Pages.

* cited by examiner

CONTEXTUAL CURSOR DISPLAY BASED ON HAND TRACKING

BACKGROUND

Providing an intuitive feedback system has an important role in achieving a perceptibly responsive computing system. Without feedback, users may have difficulty understanding the effect of their input on the computer system, and indeed whether their input is even being registered by the computing system. Conventional computing systems inherently provide aural and haptic feedback to the user through depressible buttons or clickers. For example, as a user types, the springs of a conventional keyboard provide physical resistance felt by the user's fingers and emit sounds, providing users with immediate feedback that their input is being registered by the keyboard. However, applying these feedback systems becomes challenging in a holographic environment that may utilize the user's gaze direction and hand gestures as input, rather than a physical input device that provides haptic and aural feedback when touched.

SUMMARY

To address these issues, a head mounted display device and a method for providing contextual cursors in a virtual or augmented reality environment is provided. According to one aspect, the head mounted display device comprises a camera configured to capture a series of images, a display, and a processor configured to: display, to a user of the head mounted display device, a virtual cursor on the display so as to appear at a location in a three dimensional environment, determine whether motion of a hand of the user in the images is trackable, and in response to at least determining that motion of the hand is trackable, modify a visual appearance of the virtual cursor to indicate that motion of the hand is trackable, and in response to at least determining that motion of the hand is not trackable, modify the visual appearance of the virtual cursor to indicate that motion of the hand is not trackable.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present description relates to a head mounted display device and method for providing contextual based cursors in a virtual or augmented reality environment. More particularly, the present description relates to modifying a visual appearance of a virtual cursor that is displayed to a user of the head mounted display device. Utilizing contextual information, the displayed visual appearance of the virtual cursor is modified in order to provide feedback to the user. The visual appearance of the virtual cursor may afford the user understanding of whether the user's hand is currently trackable for the head mounted display, as well as what programmatic function the head mounted display has selected based on the contextual information. Accordingly, the user is provided with feedback that allows the user to understand, prior to entering user input, not only if the user input will have an effect, but also what effect the user input will have on the virtual or augmented reality environment being viewed by the user at that time.

Figure 1:
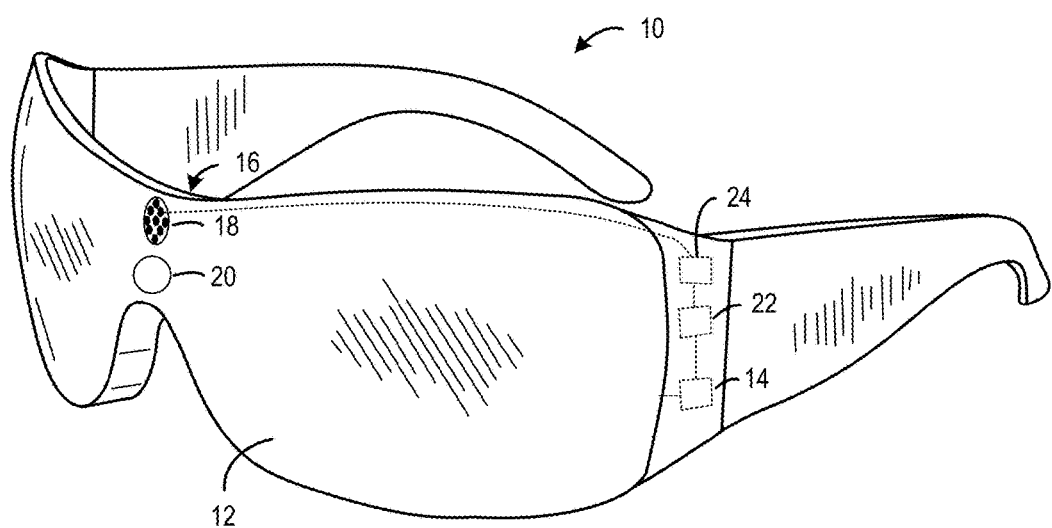
FIG. 1 shows a head mounted display device according to an embodiment of the present description.

FIG. 1 illustrates an example head mounted display device 10. The illustrated head mounted display device 10 takes the form of wearable glasses or goggles, but it will be appreciated that other forms are possible. The head mounted display device 10 may be configured in an augmented reality configuration to present an augmented reality environment, and thus may include an at least partially see-through stereoscopic display 12 that may be configured to visually augment an appearance of a physical environment being viewed by the user through the at least partially see-through stereoscopic display 12. In some examples, the at least partially see-through stereoscopic display 12 may include one or more regions that are transparent (e.g. optically clear) and may include one or more regions that are opaque or semi-transparent. In other examples, the at least partially see-through stereoscopic display 12 may be transparent (e.g. optically clear) across an entire usable display surface of the stereoscopic display 12. Alternatively, the head mounted display device 10 may be configured in a virtual reality configuration to present a full virtual reality environment, and thus the stereoscopic display 12 may be a non-see-though stereoscopic display. The head mounted display device 10 may be configured to display virtual three dimensional environments to the user via the non-see-through stereoscopic display. The head mounted display device 10 may be configured to display a virtual representation such as a three dimensional graphical rendering of the physical environment in front of the user that may include additional virtual objects, such as a virtual cursor, or may be configured to display camera-captured images of the physical environment along with additional virtual objects including the virtual cursor overlaid on the camera-captured images.

For example, the head mounted display device 10 may include an image production system 14 that is configured to display virtual objects to the user with the stereoscopic display 12. In the augmented reality configuration with an at least partially see-through display, the virtual objects are visually superimposed onto the physical environment that is visible through the display so as to be perceived at various depths and locations. In the virtual reality configuration, the image production system 14 may be configured to display virtual objects to the user with the non-see-through stereoscopic display, such that the virtual objects are perceived to be at various depths and locations relative to one another. In one embodiment, the head mounted display device 10 may use stereoscopy to visually place a virtual object at a desired depth by displaying separate images of the virtual object to both of the user's eyes. Using this stereoscopy technique, the head mounted display device 10 may control the displayed images of the virtual objects, such that the user will perceive that the virtual objects exist at a desired depth and location in the viewed physical environment. In one example, the virtual object may be a virtual cursor that is displayed to the user, such that the virtual cursor appears to the user to be located at a desired location in the virtual three dimensional environment. In the augmented reality configuration, the virtual object may be a holographic cursor that is displayed to the user, such that the holographic cursor appears to the user to be located at a desired location in the real world physical environment.

The head mounted display device 10 includes an optical sensor system 16 that may include one or more optical sensors. In one example, the optical sensor system 16 includes an outward facing optical sensor 18 that may be configured to detect the real-world background from a similar vantage point (e.g., line of sight) as observed by the user through the at least partially see-through stereoscopic display 12. The optical sensor system 16 may additionally include an inward facing optical sensor 20 that may be configured to detect a gaze direction of the user's eye. It will be appreciated that the outward facing optical sensor 18 may include one or more component sensors, including an RGB camera and a depth camera. The RGB camera may be a high definition camera or have another resolution. The depth camera may be configured to project non-visible light and capture reflections of the projected light, and based thereon, generate an image comprised of measured depth data for each pixel in the image. This depth data may be combined with color information from the image captured by the RGB camera, into a single image representation including both color data and depth data, if desired. In a virtual reality configuration, the color and depth data captured by the optical sensor system 16 may be used to perform surface reconstruction and generate a virtual model of the real-world background that may be displayed to the user via the display 12. Alternatively, the image data captured by the optical sensor system 16 may be directly presented as image data to the user on the display 12.

The head mounted display device 10 may further include a position sensor system 22 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensor system 16 and/or position sensor information received from position sensor system 22 may be used to assess a position and orientation of the vantage point of head mounted display device 10 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined with an on-board computing system (e.g., on-board computing system 24) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

Additionally, the optical sensor information received from the optical sensor system 16 may be used to identify and track objects in the field of view of optical sensor system 16. For example, depth data captured by optical sensor system 16 may be used to identify and track motion of a user's hand. The tracked motion may include movement of the user's hand in three-dimensional space, and may be characterized with six degrees of freedom (e.g., world-space X, Y, Z, pitch, roll, yaw). The tracked motion may also be used to identify and track a hand gesture made by the user's hand. For example, one identifiable hand gesture may be moving a forefinger upwards or downwards. It will be appreciated that other methods may be used to identify and track motion of the user's hand. For example, optical tags may be placed at known locations on the user's hand or a glove worn by the user, and the optical tags may be tracked through the image data captured by optical sensor system 16.

It will be appreciated that the following examples and methods may be applied to both a virtual reality and an augmented reality configuration of the head mounted display device 10. In a virtual reality configuration, the display 12 of the head mounted display device 10 is a non-see-through display, and the three dimensional environment is a virtual environment displayed to the user. The virtual environment may be a virtual model generated based on image data captured of the real-world background by optical sensor system 16 of the head mounted display device 10. Additionally, a virtual cursor having a modifiable visual appearance is also displayed to the user on the display 12 as having a virtual location within the three dimensional environment. In an augmented reality configuration, the virtual cursor is a holographic cursor that is displayed on an at least partially see-through display, such that the virtual cursor appears to be superimposed onto the physical environment being viewed by the user.

Figure 2:
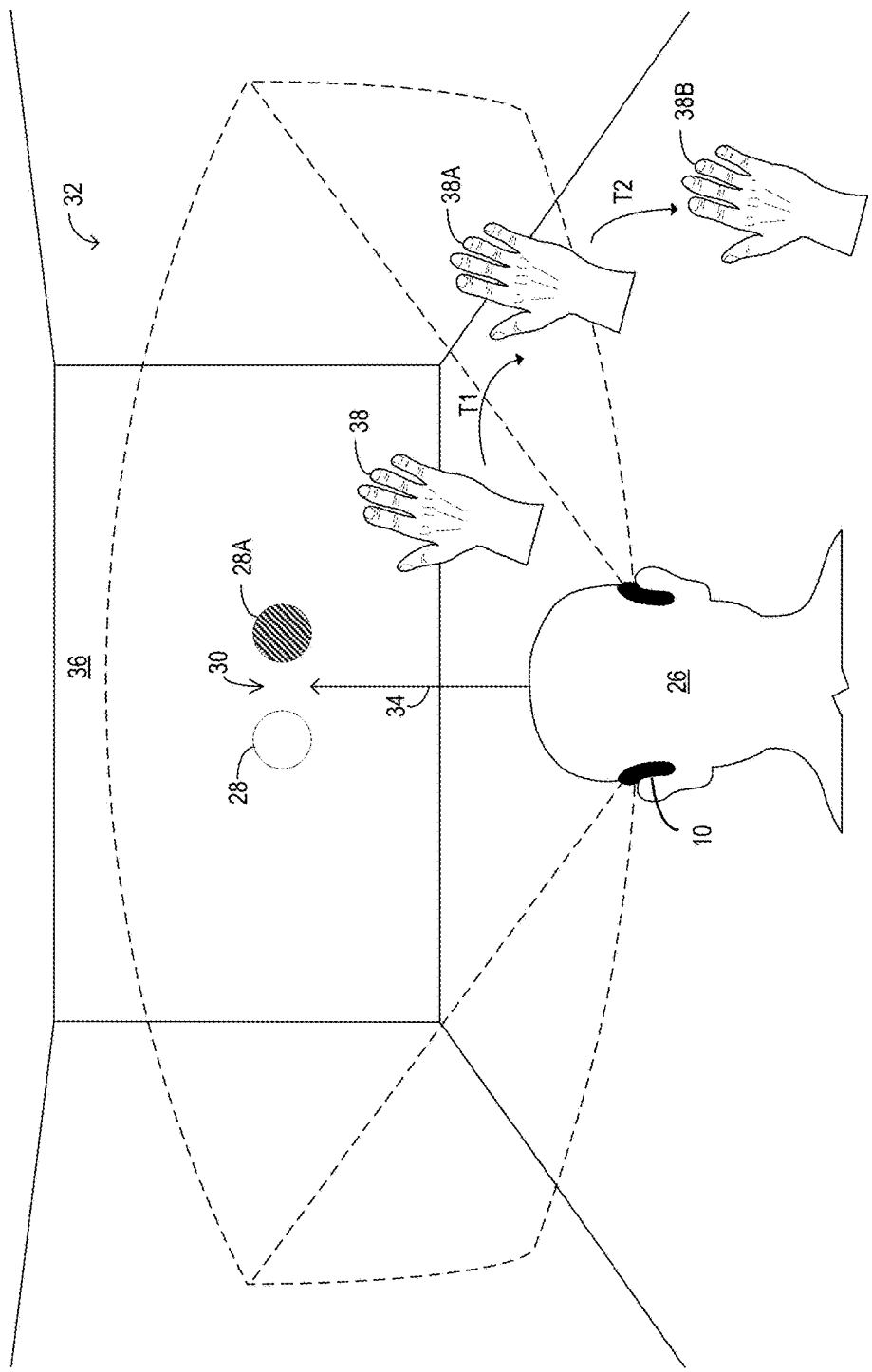
FIG. 2 shows an example visual appearance of a holographic cursor according to the embodiment of FIG. 1.

FIG. 2 illustrates an augmented reality configuration of a head mounted display device 10 worn by a user 26, displaying a virtual cursor, which is a holographic cursor 28 in this example, on the at least partially see-through stereoscopic display 12 so as to appear to at a location 30 in a three dimensional environment 32. In the specific example shown in FIG. 2, the three dimensional environment 32 is a room in the real world, and the holographic cursor 28 is displayed on the at least partially see-through stereoscopic display such that the holographic cursor 28 appears to the user 26, to be hovering in the middle of the room at the location 30. It will be appreciated that the location 30 for the holographic cursor 28 may be calculated based on a variety of suitable methods. For example, the location 30 may be calculated based on a predetermined distance and orientation relative to the user 26, such as being two feet in front of the user 26 as one specific example.

As another non-limiting example, the location 30 may be calculated based on a detected gaze direction 34 and a recognized object that intersects with the detected gaze direction. In this example, the recognized object may be a real object in the three dimensional environment. This example is illustrated in FIG. 2, with the recognized object being the wall 36 that is a part of the room that serves as the three dimensional environment 32. Accordingly, the intersection between the wall 36 and the detected gaze direction 34 of the user 26 may be used to calculate the location 30 for the holographic cursor 28. It may be advantageous to further ensure that the holographic cursor 28 is displayed to the user 26, such that the holographic cursor 28 is easily visible to the user 26. For example, to increase visibility, the location 30 of the holographic cursor 28 may be placed a threshold distance away from the recognized object to prevent the holographic cursor 28 from being occluded by any protrusions of the recognized object. Additionally, it may be advantageous to further calculate the location 30 of the holographic cursor 28 based on a plane that is orthogonal to the detected gaze direction 34 of the user 26. By placing the location 30 of the holographic cursor 28 on such a plane, a consistent view of the holographic cursor 28 may be maintained even as the user changes gaze direction.

Additionally, in the example illustrated in FIG. 2, the head mounted display device 10 worn by the user 26 may be configured to detect motion of the user's hand. Based on a series of images captured by the optical sensor system 16, the head mounted display device 10 may determine whether motion of hand 38 of the user 26 is trackable. For example, the user's hand at positions 38 and 38A are within the field of view of the optical sensor system 16. Accordingly, motion of the user's hand moving from position 38 to position 38A over time T1 is trackable by the head mounted display device 10. However, as position 38B may be outside of the field of view of the optical sensor system 16, motion of the user's hand moving from position 38A to position 38B over time T2 may not be trackable by the head mounted display device 10. It will be appreciated that the user's hand is determined to be trackable by the head mounted display when the head mounted display can monitor the hand for gesture input. Thus, the user's hand is deemed to be trackable, for example, when computer algorithms implemented in software executed on the processor of the head mounted display device 10 identify the hand in images captured by the onboard camera and begin tracking the hand, until a point in time at which those algorithms lose track of the hand. Techniques that may be used to track the hand the hand include searching for regions of similar color values and segmenting a portion of the image based on the color values from the rest of the image, as well as searching for regions of pixels that have changed, indicating foreground movement by a hand or other object. When depth information is available, the hand may be located using skeletal tracking techniques in addition or as an alternative to the above. A hand may be determined to be trackable when a confidence degree output by the algorithm indicates that the hand is being tracked with above a predetermined threshold level of confidence.

In the above embodiment, the head mounted display device 10 communicates to the user whether motion of the user's hand is trackable. In this embodiment, in response to at least determining that motion of the hand is trackable, the head mounted display device 10 modifies the visual appearance of the holographic cursor to indicate that motion of the hand is trackable. In the example illustrated in FIG. 2, the visual appearance of the holographic cursor is modified to appear as holographic cursor 28, which is an unfilled circle. Accordingly, as the user moves the hand from position 38 to position 38A over time T1, the user is shown holographic cursor having visual appearance 28 and is thus provided with the feedback that motion of the user's hand is currently trackable, and any hand gestures or hand movements will be tracked by the head mounted display device 10.

Further in this embodiment, in response to at least determining that motion of the hand is not trackable, the head mounted display device 10 modifies the visual appearance of the holographic cursor to indicate that motion of the hand is not trackable. As illustrated in FIG. 2, the visual appearance of the holographic cursor may be modified to appear as holographic cursor 28A, which has a different visual appearance than holographic cursor 28. In this example, the visual appearance of holographic cursor 28A is a filled circle. Accordingly, as the user moves the hand from position 38A to position 38B over time T2, the user is shown holographic cursor having visual appearance 28A and is thus provided with the feedback that motion of the user's hand is not currently trackable. It will be appreciated that while the example illustrated in FIG. 2 modifies the visual appearance of the holographic cursor to appear as a filled or unfilled circle, any suitable visual modification is possible. As a few other non-limiting examples, the visual appearance of the holographic cursor may be modified by changing a color, changing a shape, adding or removing an icon, or changing a size of the holographic cursor.

Figure 3:
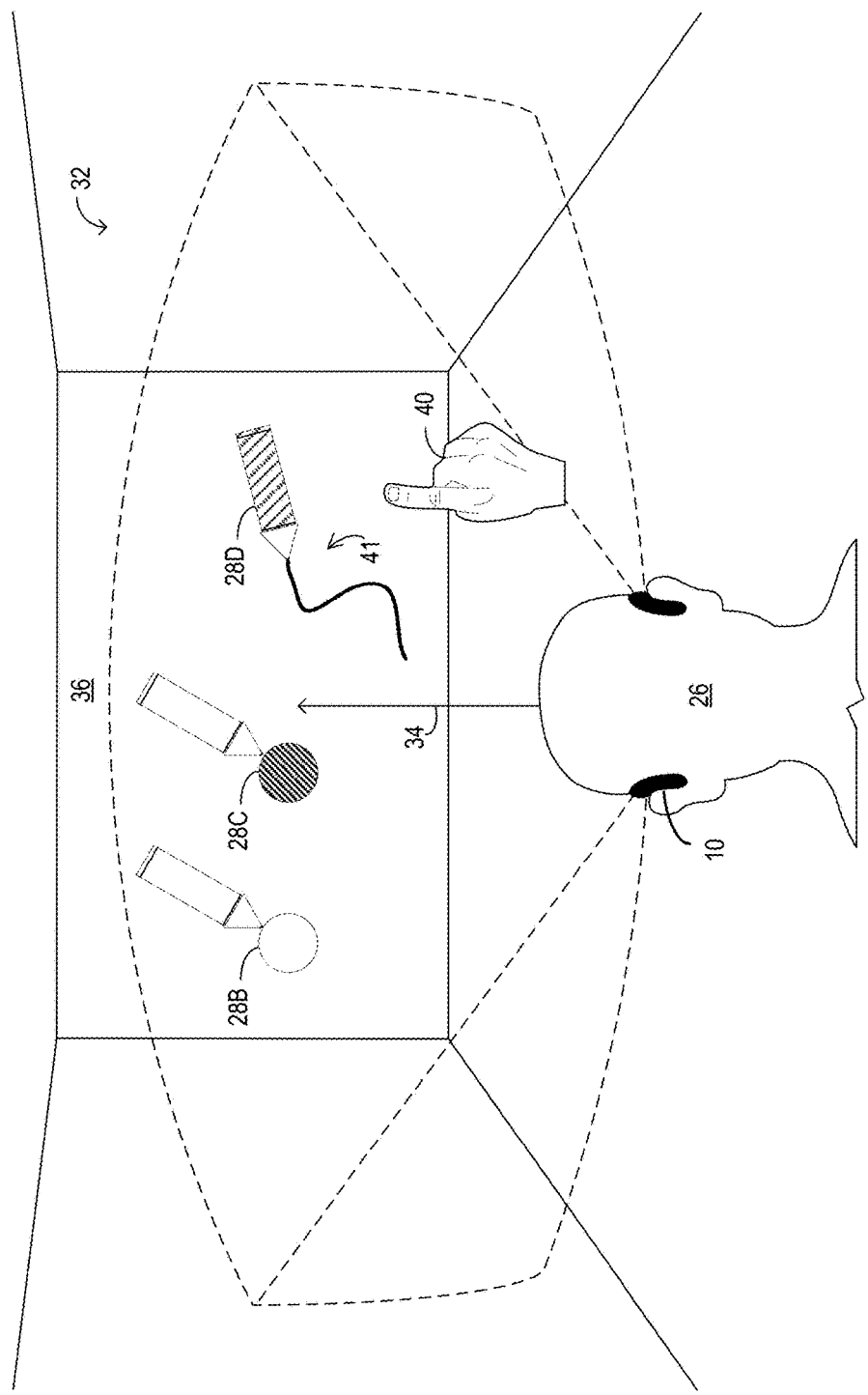
FIG. 3 shows another example visual appearance of a holographic cursor according to the embodiment of FIG. 1.

Now turning to FIG. 3, the head mounted display device 10 is further configured to track motion of the user's hand in the captured series of images to identify a user hand gesture 40. In one embodiment, the user hand gesture may be used as an input to execute a programmatic function. It will be appreciated that while the example illustrated in FIG. 3 shows a hand gesture of a raised forefinger, any suitable hand gesture may be used. In this embodiment, the specific programmatic function to be executed may be determined based on contextual information. For example, the head mounted display device 10 may determine a context based on the captured series of images and select the programmatic function based on the determined context. In this embodiment, the head mounted display device 10 may be configured to detect a recognized object in the three dimensional environment 32. In the example illustrated in FIG. 3, the recognized object is the wall 36 of the three dimensional environment 32, which is a room. The head mounted display device 10 may then determine a gaze direction of the user, determine an intersection between the recognized object and the gaze direction of the user, and determine the context based on the intersection and the recognized object. From the intersection between the user's gaze direction 34 and the wall 36, the head mounted display device 10 determines that the focus of the user's attention is on the wall.

Based on this contextual information, the head mounted display device 10 may then select an appropriate programmatic function. In the example shown in FIG. 3, the programmatic function is a drawing function. However, it will be appreciated that the head mounted display device 10 may be configured to select any suitable programmatic function based on this contextual information. Additionally, it will be appreciated that the context may be determined based on a variety of other contextual data. As a few non-limiting examples, the context may be determined based on a currently running application, the user's position, history of the user movements or actions, or a current user hand gesture.

After the programmatic function has been selected, the head mounted display device 10 may be modify the visual appearance of the holographic cursor to indicate the selected programmatic function. In the example illustrated in FIG. 3, as the selected programmatic function was a drawing function, the holographic cursor is modified to have visual appearance 28B, which includes both the unfilled circle and a pencil icon. It will be appreciated that the unfilled circle still visually indicates to the user that the motion of the user's hand currently is trackable. In this example, the holographic cursor was modified by adding the pencil icon, indicating to the user that a user input through the hand gesture 40 will currently execute the drawing function. If the user's hand is currently not trackable, the holographic cursor may be modified with visual appearance 28C, which includes the filled circle and the pencil icon, providing feedback to the user that motion of the hand is not currently being tracked and that the drawing function is currently selected. Accordingly, the user is afforded the understanding that any currently made hand gestures or movements will not execute the programmatic function of drawing on the wall, as motion of the user's hand is not currently trackable.

However, if motion of the user's hand is currently trackable, the head mounted display device 10 may be configured to track motion of the hand in the images to identify a user hand gesture. In response to at least identifying the user hand gesture, the head mounted display device may execute a programmatic function that may be selected as described above. In response to at least identifying the hand gesture, the head mounted display device 10 may be further configured to determine whether the hand gesture is being maintained based on the tracked motion of the hand. That is, the head mounted display may determine whether the user is currently holding the same hand gesture over a period of time. If the user maintains the hand gesture, the head mounted display device may continue to execute the selected programmatic function.

Additionally, the head mounted display device may further modify the visual appearance of the holographic cursor is indicate that the selected programmatic function is currently being executed. In the example illustrated in FIG. 3, the head mounted display device 10 continually executes the drawing function as the user maintains the hand gesture 40. In this particular example, continually executing the selected function results in the user virtually drawing on the wall 36. By maintaining the hand gesture 40, and user may move that hand around in trackable space of the three dimensional environment, and the head mounted display device 10 may render and display a virtual image 41 on the wall 36 that corresponds to the tracked motion of the user's hand.

As illustrated in FIG. 3, the visual appearance of the holographic cursor may provide feedback to the user that the programmatic function is currently being executed. In this example, while the user maintains the hand gesture 40, the holographic cursor is modified to have visual appearance 28D, which includes a filled pencil that has adopted a posture of drawing on the wall. Accordingly, the visual appearance 28D of the holographic cursor affords the user with the understanding that a drawing function is currently being executed, and therefore any movements of the hand will cause a virtual image to be drawn on the wall 36. When the user no longer maintains the hand gesture 40, the head mounted display device 10 may modify the visual appearance of the holographic cursor to indicate that the selected programmatic function is not currently being executed. In the example illustrated in FIG. 3, the holographic cursor may be modified to have visual appearance 28B or 28C to indicate whether motion of the hand is being tracked, and that the drawing function is currently selected.

Figure 4:
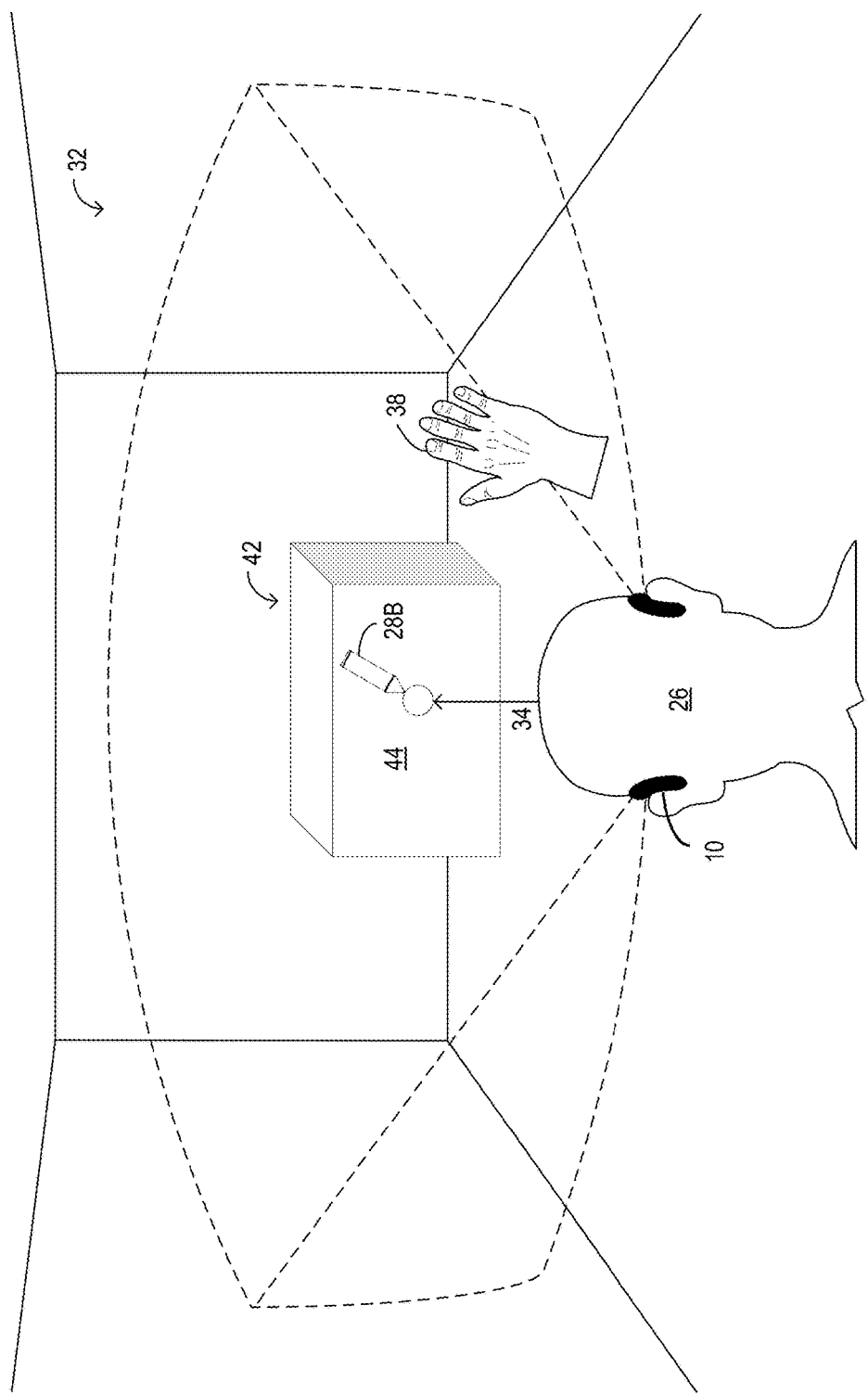
FIG. 4 shows another example visual appearance of a holographic cursor and a virtual object according to the embodiment of FIG. 1.

Now turning to FIG. 4, the recognized object may be a virtual object rather than a real physical object located in the three dimensional environment 32. In the example illustrated in FIG. 4, the recognized object is the virtual object 42, which is a three dimensional virtual object that has a world-locked position in the three dimensional environment 32. In a similar method as described above, the context may be determined based on an intersection between the virtual object 42 and the gaze direction 34 of the user 26. In this example, the intersection is located at a planar surface 44 of the virtual object 42. Accordingly, based on this contextual information, the head mounted display device 10 may selected the drawing function as the programmatic function. As the user's hand 38 is currently being tracked, the head mounted display may modify the holographic cursor to include the visual appearance 28B, which includes an unfilled circle to indicate that motion of the hand is trackable and a virtual pencil to indicate that the drawing function is selected in this example.

It will be appreciated that the virtual object 42 does not necessarily take the form illustrated in FIG. 4, and may take the form of any suitable virtual object. Additionally, the form of the virtual object may provide contextual information for which programmatic functions should be selectable. For example, the virtual object may be a virtual picture frame, and the selectable programmatic functions may be a resizing function or a moving function rather than a drawing function. The head mounted display device 10 may be configured for any programmatic function that is suitable for the form of the virtual object.

Figure 5:
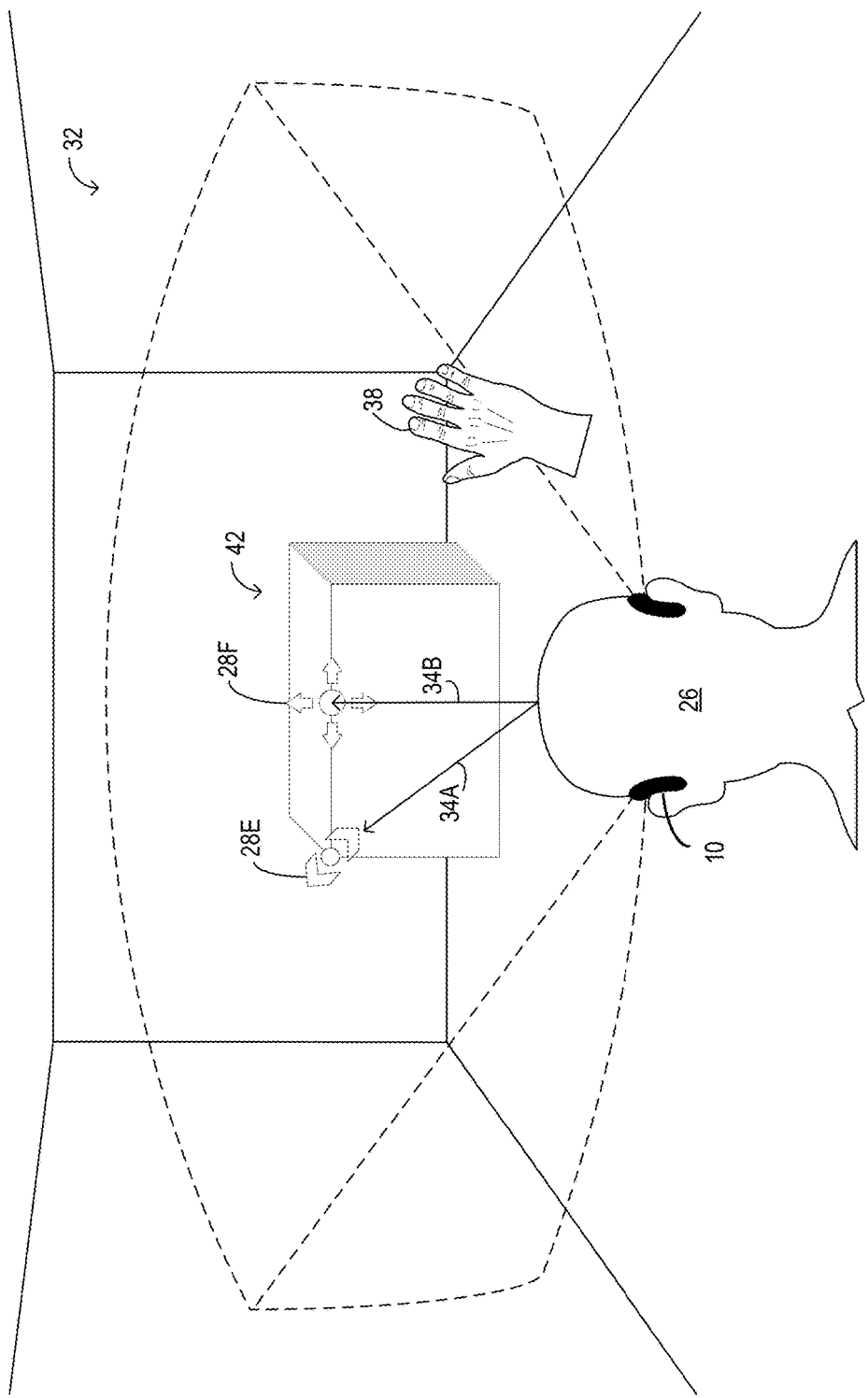
FIG. 5 shows an example visual appearance of a holographic cursor and a virtual object according to the embodiment of FIG. 1.

FIG. 5 illustrates two other non-limiting examples of selectable programmatic functions. In a first example illustrated in FIG. 5, the head mounted display device 10 may determine that the intersection between the virtual object 42 and the gaze direction 34A of the user is located at a resizing area of the virtual object 42. In this example, the resizing area may be defined as being a corner of the virtual object 42, however it will be appreciated that the resizing area may be any suitable location. Accordingly, when the user 26 adopts gaze direction 34A, the head mounted display device 10 may select a resizing function as the selected programmatic function. The resizing function may be a programmatic function to change a size of the virtual object. When the resizing function is selected, the holographic cursor is modified have the visual appearance 28E, which includes the unfilled circle to indicate that motion of the user's hand is trackable, and two chevrons that visually indicate to the user that the resizing function has been selected.

Additionally, the visual appearance 28E of the holographic cursor indicates not only that the resizing function has been selected, but also indicates a possible user input associated with the selected programmatic function based on the determined context. In this specific example, the two chevrons point in two different directions. These chevron icons indicate to the user that based on the form of the virtual object 42, that two user inputs associated with the resizing function are available. In this example, the user may move the hand 38 in the same directions indicated by the two chevrons of the visual appearance 28E of the holographic cursor in order to change the size of the virtual object 42.

In the second example illustrated in FIG. 5, the head mounted display device 10 may determine that the intersection between the virtual object 42 and the gaze direction 34B of the user is located at a moving area of the virtual object 42. In this example, the moving area may be defined as being a top edge of the virtual object 42, however it will be appreciated that the moving area may be any suitable location. Accordingly, when the user 26 adopts gaze direction 34B, the head mounted display device 10 may select a moving function as the selected programmatic function. The moving function may be a programmatic function to move the virtual object to a different location in the three dimensional environment 32. When the moving function is selected, the holographic cursor is modified have the visual appearance 28F, which includes the unfilled circle to indicate that motion of the user's hand is trackable, and four arrow icons surrounding the unfilled circle that visually indicate to the user that the moving function has been selected. These four arrow icons included in the visual appearance of the holographic cursor may indicate to the user, a possible user input associated with the selected programmatic function. In this case, the arrow icons indicate to the user that the user may move the hand 38, and that virtual object 42 will be moved to a different location in the three dimensional environment 32 based on the tracked movement of the user's hand 38.

Figure 6:
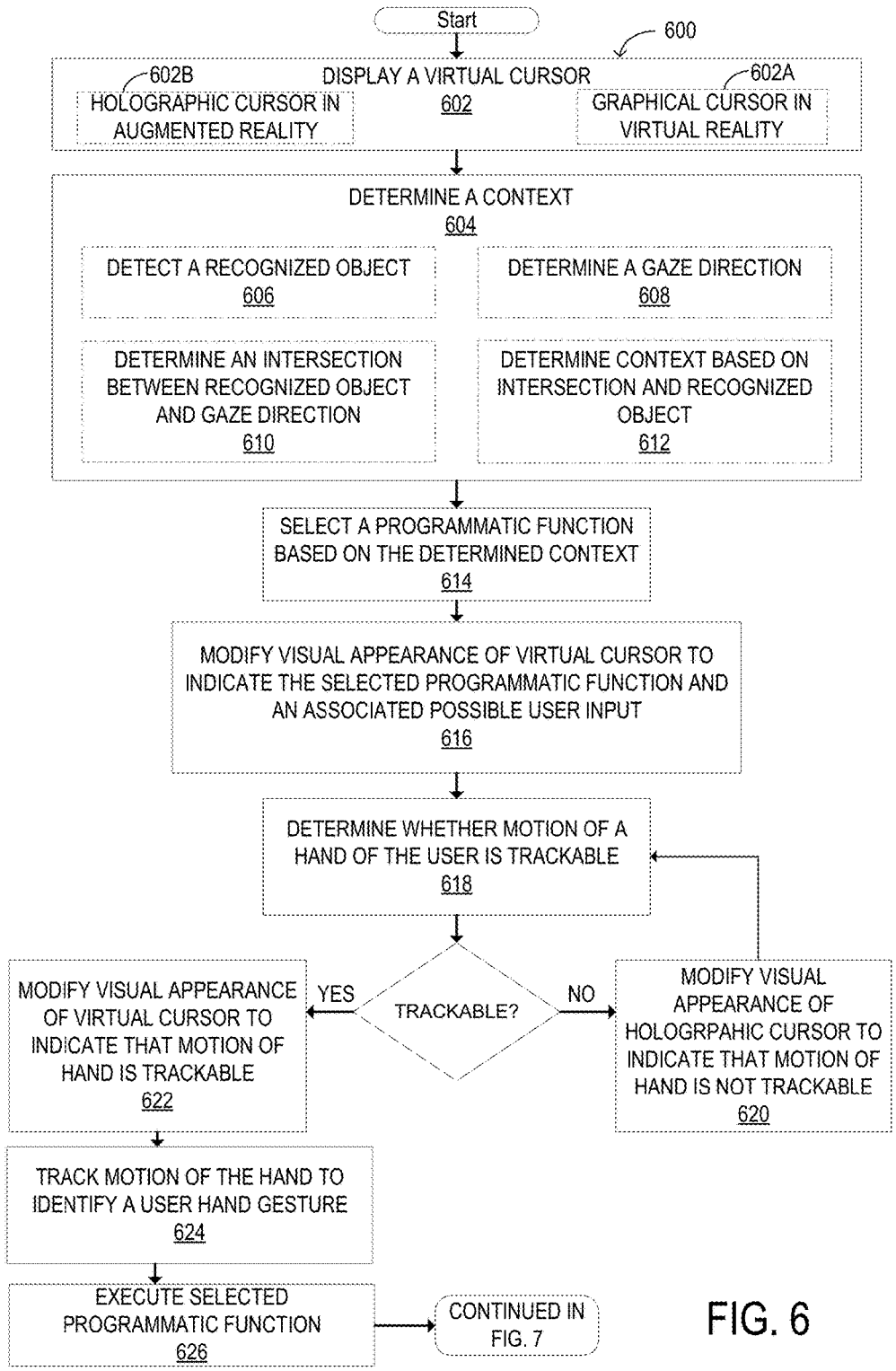
FIG. 6 shows a flow chart of a method for contextual cursors in a holographic environment according to an embodiment of the present description.

FIG. 6 shows an example method 600 for contextual cursors in a virtual or augmented reality environment. At step 602, the method 600 may include displaying a virtual cursor to a user on a display of a head mounted display device so as to appear at a location in a three dimensional environment. When method 600 is applied in a virtual reality environment, as illustrated at 602A, the method may include displaying a virtual cursor that is a graphical cursor on a non-see-through display that immerses the user in a three dimensional environment that is fully graphically rendered, or is a combination of camera captured images and graphically rendered content. Alternatively, when method 600 is applied in an augmented reality environment, as illustrated at 602B, the three dimensional environment is a physical environment, the display is an at least partially see-through display configured to display holograms superimposed onto the three dimensional environment, and the virtual cursor is a holographic cursor.

Proceeding from step 602 to step 604, the method 600 may include determining a context based on a captured series of images. Step 604 may include substeps 606, 608, 610, and 612, as follows. At substep 606, method 600 may include detecting a recognized object in the three dimensional environment. Proceeding to substep 608, the method 600 may include determining a gaze direction of the user of the head mounted display device. It will be appreciated the recognized object may be either a virtual object or a real object having positions in the three dimensional environment. In one embodiment, the recognized object is detected by the optical sensor system 16 of the head mounted display device 10. In another embodiment, the recognized object is determined by performing visual analysis on the series of images captured by the optical sensor system 16. Additionally, the gaze direction of the user may be determined based on visual data received by the inward facing optical sensor 20 of the optical sensor system 16, although it will be appreciated that other methods are possible.

After detecting the recognized object and determining the gaze direction of the user, method 600 advances from substep 608 to 610, and may include determining an intersection between the recognized object and the gaze direction of the user. Proceeding from sub step 610 to substep 612, the method 600 may include determining the context based on the intersection and the recognized object.

After determining the context, method 600 advances from step 604 to step 614 and may include selecting the programmatic function based on the determined context. It will be appreciated that the selection of the programmatic function may be determined based on a variety of suitable contextual information. In one example, the programmatic function is selected based on the type of object the recognized object is and the location that the gaze direction intersected with the recognized object. As a few other non-limiting examples, the suitable contextual information may be a current application running on the head mounted display device, a position of the user in the three dimensional environment, or past user input of the user.

Proceeding from step 614 to step 616, the method 600 may include modifying the visual appearance of the holographic cursor to indicate the selected programmatic function. It will be appreciated that the visual appearance of the holographic cursor may be modified in a variety of ways. As a few non-limiting examples, the visual appearance may be modified by changing a color, changing a shape, adding or removing an icon, or changing a size of the holographic cursor.

Advancing from step 616 to step 618, the method 600 may include determining whether motion of the hand of the user in the series of images captured by a camera of the head mounted display device is trackable.

In response to at least determining that motion of the hand is not trackable, the method 600 proceeds from step 618 to step 620 and may include modifying the visual appearance of the holographic cursor to indicate that motion of the hand is not trackable. It will be appreciated that this modification to the visual appearance of the holographic cursor may be made in substitution of or in addition to any previous modifications to the visual appearance of the holographic cursor. Next, the method 600 may return to step 618 after a period of time to determine whether the motion of the hand has become trackable.

In response to at least determining that motion of the hand is trackable, the method 600 advances from step 618 to step 622 and may include modifying the visual appearance of the holographic cursor to indicate that motion of the hand is trackable. It will be appreciated that the visual appearance may be modified in a variety of ways as discussed above, and these modifications may be made in substitution of and in addition to any previous modifications to the visual appearance of the holographic cursor.

Proceeding from step 622 to step 624, the method 600 may include tracking motion of the hand in the images to identify a user hand gesture. In response to at least identifying the hand gesture, the method 600 advances to step 626 and may include executing a programmatic function. In one embodiment, the executed programmatic function is the programmatic function selected in step 614. It will be appreciated that any suitable hand gesture may be used. In one non-limiting example, the hand gesture may be the raising or lowering or a forefinger of the user's hand while the other fingers remain clasped.

Figure 7:
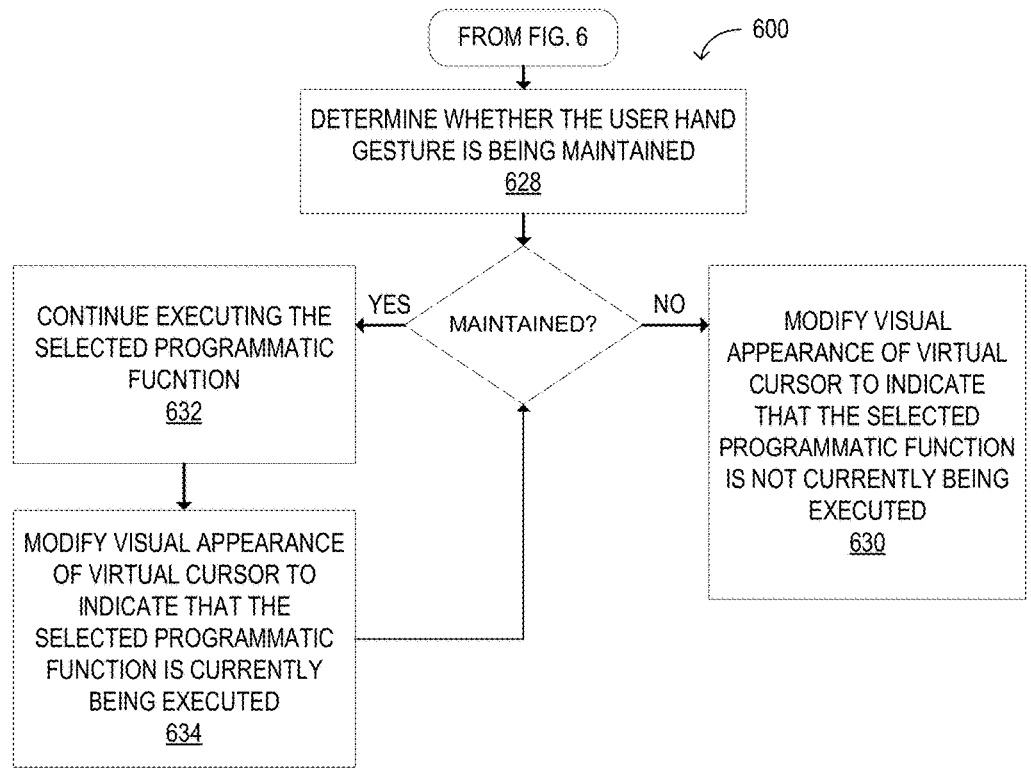
FIG. 7 shows a continuation of the flow chart of FIG. 6.

Now turning to FIG. 7, the method 600 continues. Proceeding from step 626 to step 628, the method 600 may include determining whether the hand gesture is being maintained based on the tracked motion of the hand. In response to at least determining that the hand gesture is not maintained, the method 600 advances from step 628 to step 630 and includes modifying the visual appearance of the holographic cursor to indicated that the selected programmatic function is not current being executed. It will be appreciated that the visual appearance may be modified in a variety of ways as discussed above, and these modifications may be made in substitution of and/or in addition to any previous modifications to the visual appearance of the holographic cursor.

In response to at least determining that the hand gesture is being maintained, the method 600 advances from step 628 to step 632 and may include continuing to execute the selected programmatic function. It will be appreciated that during execution of the selected programmatic function, the head mounted display device may continue to track motion of the hand of the user. The tracked motion of the hand may be used as input for the execution of the selected programmatic function.

Proceeding from step 632 to step 634, the method 600 may include modifying the visual appearance of the holographic cursor to indicate that the selected programmatic function is currently being executed. It will be appreciated that the visual appearance may be modified in a variety of way as discussed above, and these modifications may be made in substitution of and in addition to any previous modifications to the visual appearance of the holographic cursor.

Figure 8:
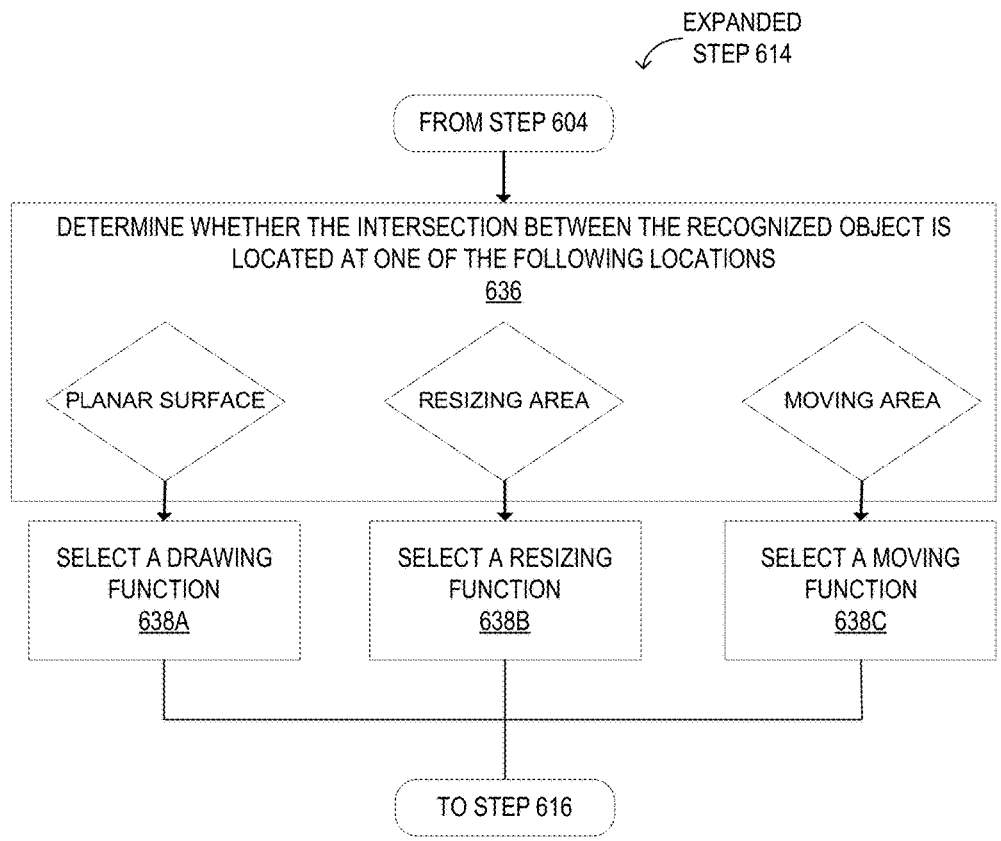
FIG. 8 shows an expansion of the flow chart of FIG. 6.

FIG. 8 shows an expanded view of substeps that may be used to accomplish step 614 to select a programmatic function. These substeps of step 614 may be applied when the recognized object is a virtual object. Proceeding from step 604 to expanded step 614, the method 600 at 636 may include determining whether the intersection between the recognized object and the gaze direction of the user is located at a planar surface of the recognized object, a resizing area of the recognized object, or a moving area of the recognized object.

In response to at least determining that the intersection is located at the planar surface of the recognized object, the method 600 proceeds from step 636 to substep 638A and may include selecting a drawing function as the programmatic function, the drawing function being a programmatic function to draw an image onto the planar surface of the recognized object.

Alternatively, in response to at least determining that the intersection is located at the resizing area of the recognized object, the method 600 proceeds from step 636 to substep 638B and may include selecting a resizing function as the programmatic function, the resizing function being a programmatic function to change a size of the recognized object.

Alternatively, in response to at least determining that the intersection is located at the moving area of the recognized object, the method 600 proceeds from step 636 to substep 638C and may include selecting a moving function as the programmatic function, the moving function being a programmatic function to move the object location of the recognized object to a different location in the three dimensional environment.

In response to at least selecting a programmatic function, the method 600 may advance from the expanded step 614 to step 616. It will be appreciated that while a drawing function, a resizing function, and a moving function are described in the expanded step 614, a variety of programmatic functions are possible.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
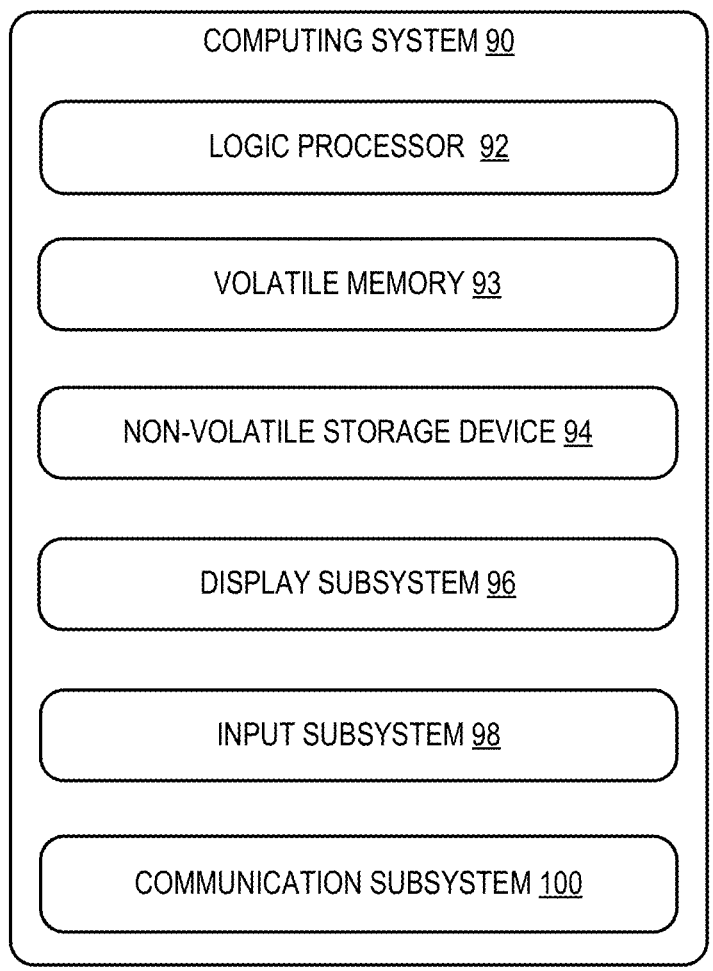
FIG. 9 shows an exemplary computing system on which the embodiments may be implemented.

FIG. 9 schematically shows a non-limiting embodiment of a computing system 90 that can enact one or more of the methods and processes described above. Computing system 90 is shown in FIG. 9 in simplified form. Computing system 90 may take the form of the head-mounted display device 10 shown in FIG. 1, and may also include or one or more devices cooperating with the head-mounted display device 10 (e.g., personal computers, server computers, tablet computers, home-entertainment computers, network computing devices, gaming devices, mobile computing devices, mobile communication devices (e.g., smart phone), other head mounted display devices, and/or other computing devices).

Computing system 90 includes a logic processor 92 volatile memory 93, and a non-volatile storage device 94. Computing system 90 may optionally include a display subsystem 96, input subsystem 98, communication subsystem 100, and/or other components not shown in FIG. 9.

Logic processor 92 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 92 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood. Logic processor 92 may include the image production subsystem 14 described above, which may be included in hardware-implemented logic (such as an ASIC or system-on-chip) or as stored software or firmware executed by logic processor 92.

Non-volatile storage device 94 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 94 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 94 may include nonvolatile, dynamic, static, read/write, read-only, sequential-access, location-addressable, file-addressable, and/or content-addressable devices. It will be appreciated that non-volatile storage device 94 is configured to hold instructions even when power is cut to the non-volatile storage device 94.

Volatile memory 93 may include physical devices that include random access memory. Volatile memory 93 is typically utilized by logic processor 92 to temporarily store information during processing of software instructions. It will be appreciated that volatile memory 93 typically does not continue to store instructions when power is cut to the volatile memory 93.

Aspects of logic processor 92, volatile memory 93, and non-volatile storage device 94 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. When computing system 90 is formed as the head mounted display device 10 of FIG. 1, the on-board computing system 24 may integrate aspects of logic processor 92, volatile memory 93, and non-volatile storage device 94. In one embodiment, the on-board computing system 24 may be a system-on-chip, for example.

The terms "module," "program," and "engine" may be used to describe an aspect of computing system 90 implemented to perform a particular function. In some cases, a module, program, or engine may be instantiated via logic processor 92 executing instructions held by non-volatile storage device 94, using portions of volatile memory 93. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 96 may be used to present a visual representation of data held by non-volatile storage device 94. When computing system 90 is formed as the head mounted display device 10 of FIG. 1, display subsystem 96 may include the at least partially see-through stereoscopic display 12 and be configured to present a visual representation of data generated by image production subsystem 14. Alternatively, in the virtual reality embodiments, display subsystem 96 may include display 12 that is a non-see-through stereoscopic display and be configured to present a visual representation of data generated by image production subsystem 14. This visual representation may take the form of a graphical user interface (GUI). As the herein described methods and processes change the data held by the non-volatile storage device, and thus transform the state of the non-volatile storage device, the state of display subsystem 96 may likewise be transformed to visually represent changes in the underlying data. Display subsystem 96 may include one or more display devices utilizing virtually any type of technology. Such display devices may be combined with logic processor 92, volatile memory 93, and/or non-volatile storage device 94 in a shared enclosure, or such display devices may be peripheral display devices. The at least partially see-through display 12 of head mounted display device 10 described above is one example of a display subsystem 96.

When included, input subsystem 98 may comprise or interface with one or more user-input devices such as a keyboard, mouse, touch screen, or game controller. When computing system 90 is formed as the head mounted display device 10 of FIG. 1, the input subsystem 98 may include the position sensor system 22 and optical sensor system 16, including outward facing optical sensor 18 and inward facing optical sensor 20. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; any of the sensors described above with respect to position sensor system 22 and optical sensor system 16 of the head mounted display device 10 of FIG. 1; and/or any other suitable sensor.

When included, communication subsystem 100 may be configured to communicatively couple computing system 90 with one or more other computing devices. Communication subsystem 100 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 90 to send and/or receive messages to and/or from other devices via a network such as the Internet. Thus, the head mounted display system 10 of FIG. 1 may include communication subsystem 100, and be configured to communicatively couple with one or more other computing devices, such as a server system or a local computing system.

The following paragraphs provide additional support for the claims of the subject application. One aspect provides a head mounted display device for contextual cursors in a virtual or augmented reality environment comprising: a camera configured to capture a series of images, a display, and a processor configured to: display, to a user of the head mounted display device, a virtual cursor on the display so as to appear at a location in a three dimensional environment, determine whether motion of a hand of the user in the images is trackable, in response to at least determining that motion of the hand is trackable, modify a visual appearance of the virtual cursor to indicate that motion of the hand is trackable, and in response to at least determining that motion of the hand is not trackable, modify the visual appearance of the virtual cursor to indicate that motion of the hand is not trackable. The head mounted display device may additionally or alternatively include, wherein the three dimensional environment is a physical environment, the display is an at least partially see-through display configured to display holograms superimposed onto the three dimensional environment, and the virtual cursor is a holographic cursor. The head mounted display device may additionally or alternatively include, wherein to modify the visual appearance of the holographic cursor, the processor is further configured to: change a color, change a shape, add or remove an icon, or change a size of the holographic cursor. The head mounted display device may additionally or alternatively include, wherein in response to at least determining that motion of the hand is trackable, the processor is further configured to: track motion of the hand in the images to identify a user hand gesture, and in response to at least identifying the hand gesture, execute a programmatic function. The head mounted display device may additionally or alternatively include, wherein the processor is further configured to: determine a context based on the captured series of images, and select the programmatic function based on the determined context. The head mounted display device may additionally or alternatively include, wherein the processor is further configured to: modify the visual appearance of the holographic cursor to indicate the selected programmatic function. The head mounted display device may additionally or alternatively include, wherein to determine the context based on the captured series of images, the processor is further configured to: detect a recognized object in the three dimensional environment, determine a gaze direction of the user of the head mounted display device, determine an intersection between the recognized object and the gaze direction of the user, and determine the context based on the intersection and the recognized object. The head mounted display device may additionally or alternatively include, wherein in response to at least identifying the hand gesture, the processor is further configured to: determine whether the hand gesture is being maintained based on the tracked motion of the hand, in response to at least determining that the hand gesture is being maintained, continue executing the selected programmatic function and modify the visual appearance of the holographic cursor to indicate that the selected programmatic function is currently being executed, and in response to at least determining that the hand gesture is not maintained, modify the visual appearance of the holographic cursor to indicate that the selected programmatic function is not currently being executed. The head mounted display device may additionally or alternatively include, the processor is further configured to: in response to at least selecting the programmatic function based on the determined context, modify the visual appearance of the holographic cursor to indicate to the user, a possible user input associated with the selected programmatic function based on the determined context. The head mounted display device may additionally or alternatively include, wherein the recognized object is a virtual object having an object location in the three dimensional environment, and the processor is further configured to: determine whether the intersection between the recognized object and the gaze direction of the user is located at a planar surface of the recognized object, a resizing area of the recognized object, or a moving area of the recognized object, in response to at least determining that the intersection is located at the planar surface of the recognized object, select a drawing function as the selected programmatic function, the drawing function being a programmatic function to draw an image onto the planar surface of the recognized object, in response to at least determining that the intersection is located at the resizing area of the recognized object, select a resizing function as the selected programmatic function, the resizing function being a programmatic function to change a size of the recognized object, and in response to at least determining that the intersection is located at the moving area of the recognized object, select a moving function as the selected programmatic function, the moving function being a programmatic function to move the object location of the recognized object to a different location in the three dimensional environment.

Another aspect provides a method for contextual cursors in a virtual or augmented reality environment comprising: displaying a virtual cursor to a user on a display of a head mounted display device so as to appear at a location in a three dimensional environment, determining whether motion of a hand of the user in a series of images captured by a camera of the head mounted display device is trackable, in response to at least determining that motion of the hand is trackable, modifying a visual appearance of the virtual cursor to indicate that motion of the hand is trackable, and in response to at least determining that motion of the hand is not trackable, modifying the visual appearance of the virtual cursor to indicate that motion of the hand is not trackable. The method may additionally or optionally include, wherein the three dimensional environment is a physical environment, the display is an at least partially see-through display configured to display holograms superimposed onto the three dimensional environment, and the virtual cursor is a holographic cursor. The method may additionally or optionally include, wherein modifying the visual appearance of the holographic cursor further comprises: changing a color, changing a shape, adding or removing an icon, or changing a size of the holographic cursor. The method may additionally or optionally include, wherein in response to at least determining that motion of the hand is trackable, the method further comprises: tracking motion of the hand in the images to identify a user hand gesture, and in response to at least identifying the hand gesture, executing a programmatic function. The method may additionally or optionally include, determining a context based on the captured series of images, selecting the programmatic function based on the determined context, and modifying the visual appearance of the holographic cursor to indicate the selected programmatic function. The method may additionally or optionally include, wherein determining the context based on the captured series of images, further comprises: detecting a recognized object in the three dimensional environment, determining a gaze direction of the user of the head mounted display device, determining an intersection between the recognized object and the gaze direction of the user, and determining the context based on the intersection and the recognized object. The method may additionally or optionally include, wherein in response to at least identifying the hand gesture, the method further comprises: determining whether the hand gesture is being maintained based on the tracked motion of the hand, in response to at least determining that the hand gesture is being maintained, continuing to execute the selected programmatic function and modifying the visual appearance of the holographic cursor to indicate that the selected programmatic function is currently being executed, and in response to at least determining that the hand gesture is not maintained, modifying the visual appearance of the holographic cursor to indicate that the selected programmatic function is not currently being executed. The method may additionally or optionally include, in response to at least selecting the programmatic function based on the determined context, modifying the visual appearance of the holographic cursor to indicate to the user, a possible user input associated with the selected programmatic function based on the determined context. The method may additionally or optionally include, wherein the recognized object is a virtual object having an object location in the three dimensional environment, and further comprising: determining whether the intersection between the recognized object and the gaze direction of the user is located at a planar surface of the recognized object, a resizing area of the recognized object, or a moving area of the recognized object, in response to at least determining that the intersection is located at the planar surface of the recognized object, selecting a drawing function as the selected programmatic function, the drawing function being a programmatic function to draw an image onto the planar surface of the recognized object, in response to at least determining that the intersection is located at the resizing area of the recognized object, selecting a resizing function as the selected programmatic function, the resizing function being a programmatic function to change a size of the recognized object, and in response to at least determining that the intersection is located at the moving area of the recognized object, selecting a moving function as the selected programmatic function, the moving function being a programmatic function to move the object location of the recognized object to a different location in the three dimensional environment.

Another aspect provides a head mounted display device for contextual cursors in a holographic environment comprising: a camera configured to capture a series of images, an at least partially see-through display configured to display holograms, and a processor configured to: display, to a user of the head mounted display device, a holographic cursor on the at least partially see-though display so as to appear at a location in a three dimensional environment, determine a context based on the captured series of images, select a programmatic function based on the determined context, modify a visual appearance of the holographic cursor to indicate the selected programmatic function, and track motion of the hand in the images to identify a user hand gesture, and in response to at least identifying the hand gesture, execute the selected programmatic function.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A head mounted display device for contextual cursors in a virtual or augmented reality environment comprising:
   a camera configured to capture a series of images;
   a display; and
   a processor configured to:
      display, to a user of the head mounted display device, a virtual cursor on the display so as to appear at a location in a three dimensional environment;
      determine a context based on the captured series of images by detecting a recognized virtual object in the three dimensional environment based on a gaze direction of the user;
      determine whether an intersection between the recognized virtual object and the gaze direction of the user is located at a planar surface, a resizing area, or a moving area of the recognized virtual object;
      select a programmatic function based on the determined context and whether the gaze direction is located at the planar surface, the resizing area, or the moving area of the recognized virtual object, wherein:
         when the intersection is located at the planar surface, a planar surface interaction function is selected, the planar surface interaction function being a drawing function, the drawing function being a programmatic function to draw an image onto the planar surface of the recognized object;
         when the intersection is located at the resizing area, a resizing function is selected, the resizing function being a programmatic function to change a size of the recognized object; and
         when the intersection is located at the moving area, a moving function is selected, the moving function being a programmatic function to move an object location of the recognized object to a different location in the three dimensional environment;
      determine whether motion of a hand of the user in the images is trackable;
      in response to at least determining that motion of the hand is trackable, modify a visual appearance of the virtual cursor to indicate the selected programmatic function and that motion of the hand is trackable;
      track motion of the hand in the images to identify a hand gesture of the user;
      in response to at least identifying the hand gesture, execute the programmatic function; and
      in response to at least determining that motion of the hand is not trackable, modify the visual appearance of the virtual cursor to indicate that motion of the hand is not trackable.

2. The head mounted display device of claim 1, wherein the three dimensional environment is a physical environment, the display is an at least partially see-through display configured to display holograms superimposed onto the three dimensional environment, and the virtual cursor is a holographic cursor.

3. The head mounted display device of claim 2, wherein to modify the visual appearance of the holographic cursor, the processor is further configured to:
   change a color, change a shape, add or remove an icon, or change a size of the holographic cursor.

4. The head mounted display device of claim 2, wherein in response to at least identifying the hand gesture, the processor is further configured to:
   determine whether the hand gesture is being maintained based on the tracked motion of the hand;
   in response to at least determining that the hand gesture is being maintained, continue executing the selected programmatic function and modify the visual appearance of the holographic cursor to indicate that the selected programmatic function is currently being executed; and
   in response to at least determining that the hand gesture is not maintained, modify the visual appearance of the holographic cursor to indicate that the selected programmatic function is not currently being executed.

5. The head mounted display device of claim 2, wherein the processor is further configured to:
   in response to at least selecting the programmatic function based on the determined context, modify the visual appearance of the holographic cursor to indicate to the user, a possible user input associated with the selected programmatic function based on the determined context.

6. A method for contextual cursors in a virtual or augmented reality environment comprising:
   displaying a virtual cursor to a user on a display of a head mounted display device so as to appear at a location in a three dimensional environment;
   determining whether motion of a hand of the user in a series of images captured by a camera of the head mounted display device is trackable;
   determining a context based on the captured series of images by detecting a recognized virtual object in the three dimensional environment based on a gaze direction of the user;

determining whether an intersection between the recognized virtual object and the gaze direction of the user is located at a planar surface, a resizing area, or a moving area of the recognized virtual object;

selecting a programmatic function based on the determined context and whether the gaze direction is located at the planar surface, the resizing area, or the moving area of the recognized virtual object, wherein:

when the intersection is located at the planar surface, a planar surface interaction function is selected, the planar surface interaction function being a drawing function, the drawing function being a programmatic function to draw an image onto the planar surface of the recognized object;

when the intersection is located at the resizing area, a resizing function is selected, the resizing function being a programmatic function to change a size of the recognized object; and when the intersection is located at the moving area, a moving function is selected, the moving function being a programmatic function to move an object location of the recognized object to a different location in the three dimensional environment;

in response to at least determining that motion of the hand is trackable, modifying a visual appearance of the virtual cursor to indicate the selected programmatic function and that motion of the hand is trackable;

tracking motion of the hand in the images to identify a hand gesture of the user;

in response to at least identifying the hand gesture, executing the programmatic function; and in response to at least determining that motion of the hand is not trackable, modifying the visual appearance of the virtual cursor to indicate that motion of the hand is not trackable.

7. The method of claim 6, wherein the three dimensional environment is a physical environment, the display is an at least partially see-through display configured to display holograms superimposed onto the three dimensional environment, and the virtual cursor is a holographic cursor.

8. The method of claim 7, wherein modifying the visual appearance of the holographic cursor further comprises:
changing a color, changing a shape, adding or removing an icon, or changing a size of the holographic cursor.

9. The method of claim 7, wherein in response to at least identifying the hand gesture, the method further comprises:
determining whether the hand gesture is being maintained based on the tracked motion of the hand;
in response to at least determining that the hand gesture is being maintained, continuing to execute the selected programmatic function and modifying the visual appearance of the holographic cursor to indicate that the selected programmatic function is currently being executed; and
in response to at least determining that the hand gesture is not maintained, modifying the visual appearance of the holographic cursor to indicate that the selected programmatic function is not currently being executed.

10. The method of claim 7, further comprising:
in response to at least selecting the programmatic function based on the determined context, modifying the visual appearance of the holographic cursor to indicate to the user, a possible user input associated with the selected programmatic function based on the determined context.

11. A head mounted display device for contextual cursors in a holographic environment comprising:
a camera configured to capture a series of images;
an at least partially see-through display configured to display holograms; and
a processor configured to:
display, to a user of the head mounted display device, a holographic cursor on the at least partially see-though display so as to appear at a location in a three dimensional environment;
determine a context based on the captured series of images by detecting a recognized virtual object in the three dimensional environment based on a gaze direction of the user;
determine whether an intersection between the recognized virtual object and the gaze direction of the user is located at a planar surface, a resizing area, or a moving area of the recognized virtual object;
select a programmatic function based on the determined context and whether the gaze direction is located at the planar surface, the resizing area, or the moving area of the recognized virtual object, wherein:
when the intersection is located at the planar surface, a planar surface interaction function is selected, the planar surface interaction function being a drawing function, the drawing function being a programmatic function to draw an image onto the planar surface of the recognized object;
when the intersection is located at the resizing area, a resizing function is selected, the resizing function being a programmatic function to change a size of the recognized object; and
when the intersection is located at the moving area, a moving function is selected, the moving function being a programmatic function to move the object location of the recognized object to a different location in the three dimensional environment;
modify a visual appearance of the holographic cursor to indicate the selected programmatic function; and
track motion of the hand in the images to identify a hand gesture of the user; and
in response to at least identifying the hand gesture, execute the selected programmatic function.

* * * * *